(12) United States Patent
Boodannavar et al.

(10) Patent No.: US 9,930,561 B2
(45) Date of Patent: Mar. 27, 2018

(54) SPATIAL MULTIPLEXING POWER SAVE LEARNING MODE

(71) Applicant: Apple Inc., Cupertino, CA (US)

(72) Inventors: Veerendra Boodannavar, Sunnyvale, CA (US); Kapil Chhabra, Cupertino, CA (US); Zheng Zeng, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 15/173,527

(22) Filed: Jun. 3, 2016

(65) Prior Publication Data

US 2016/0360489 A1 Dec. 8, 2016

Related U.S. Application Data

(60) Provisional application No. 62/171,939, filed on Jun. 5, 2015, provisional application No. 62/171,938, filed on Jun. 5, 2015.

(51) Int. Cl.

| | |
|---|---|
| *H04W 4/00* | (2009.01) |
| *H04W 28/02* | (2009.01) |
| *H04B 7/0413* | (2017.01) |
| *H04W 52/02* | (2009.01) |
| *H04W 24/08* | (2009.01) |
| *H04W 84/12* | (2009.01) |

(52) U.S. Cl.
CPC ...... *H04W 28/0231* (2013.01); *H04B 7/0413* (2013.01); *H04W 24/08* (2013.01); *H04W 52/0235* (2013.01); *H04W 52/0261* (2013.01); *H04W 52/0274* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 9,037,104 B2 | 5/2015 | Fernando et al. | |
| 2008/0013504 A1* | 1/2008 | Nishibayashi | G06F 3/14 370/338 |
| 2011/0268060 A1 | 11/2011 | Heidari et al. | |
| 2013/0343251 A1* | 12/2013 | Zhang | H04W 52/0212 370/311 |
| 2014/0105186 A1 | 4/2014 | Park et al. | |
| 2015/0005023 A1 | 1/2015 | Wang et al. | |

(Continued)

*Primary Examiner* — Jutai Kao
(74) *Attorney, Agent, or Firm* — Downey Brand LLP

(57) ABSTRACT

Apparatus and methods for configuring wireless circuitry of a wireless communication device associated with a wireless local area network (WLAN) access point (AP) to use a reduced power consumption mode are disclosed. While associated with a multiple-input multiple-output (MIMO) WLAN AP and operating in a MIMO mode that includes at least two spatial streams for communication with multiple radio frequency (RF) receive chains active, the wireless communication device transmits a message indicating a request to use a spatial multiplexing power save (SMPS) mode that supports only one spatial stream and requires only a single active RF receive chain. The wireless communication device monitors packets received from the WLAN AP after a guard interval following the request and only switches to the SMPS mode when all packets received after the guard interval use only one spatial stream.

20 Claims, 8 Drawing Sheets

(56) References Cited

U.S. PATENT DOCUMENTS

| | | |
|---|---|---|
| 2015/0181469 A1 | 6/2015 | Yu et al. |
| 2016/0021484 A1 | 1/2016 | Park et al. |
| 2016/0127997 A1 | 5/2016 | Ang et al. |
| 2016/0165544 A1 | 6/2016 | Pefkianakis et al. |
| 2016/0359661 A1 | 12/2016 | Chhabra et al. |

* cited by examiner

500 

MIMO-Capable AP and MIMO-Capable STA
Operating Modes

| Device State | MIMO (2 Spatial, 2 RX) | SISO (1 Spatial, 1 RX) | SIMO (1 Spatial, 2 RX) |
|---|---|---|---|
| Unassociated Scanning | NO | YES (UI, Auto Join) | YES (Location) |
| Associating | YES (Advertise MIMO) | YES | NO |
| Associated Sleep | NO | YES (Beacon, High RSSI) | YES (Beacon, Low RSSI) |
| Associated Scanning | NO | YES | NO |
| Associated Foreground Data (High Vol) | YES | NO | NO |
| Associated Foreground Data (Low Vol) | NO | YES (High RSSI) | YES (Low RSSI) |
| Associated Background Data (High Vol) | YES | NO | NO |
| Associated Background Data (Low Vol) | NO | YES (High RSSI) | YES (Low RSSI) |
| Battery Save Mode | NO | YES | NO |
| Low Battery Level | NO | YES | NO |

*FIG. 5*

SPATIAL MULTIPLEXING POWER SAVE LEARNING MODE

CROSS-REFERENCE TO RELATED APPLICATIONS

This application claims the benefit of U.S. Provisional Application No. 62/171,939, entitled "METHOD AND APPARATUS FOR SPATIAL MULTIPLEXING POWER SAVE LEARNING MODE", filed Jun. 5, 2015, and U.S. Provisional Application No. 62/171,938, entitled "METHOD AND APPARATUS FOR MIMO WLAN POWER OPTIMIZATION", filed Jun. 5, 2015, the contents of both of which are incorporated by reference herein in their entirety for all purposes.

This application is related to U.S. application Ser. No. 15/166,020, entitled "METHOD AND APPARATUS FOR MIMO WLAN POWER OPTIMIZATION", filed May 26, 2016.

FIELD

The described embodiments generally relate to wireless communications, including, to methods and apparatus for a spatial multiplexing power save (SMPS) learning mode for a multiple-input multiple-output (MIMO) capable wireless communication device.

BACKGROUND

Wireless communication devices, such as cellular telephones, cellular-enabled tablet computers, and other portable wireless devices with cellular communications capability can include wireless circuitry that can provide for communication in accordance with various wireless communication protocols. For example, cellular telephones, typically, include wireless personal area network (WPAN) radio frequency (RF) circuitry, such as Bluetooth® circuitry, and wireless local area network (WLAN) RF circuitry, such as Wi-Fi circuitry, to supplement cellular RF circuitry to provide a broad spectrum of communication services. WLAN connections via a WLAN access point, typically with a broadband, wired backhaul, can provide high throughput to the wireless communication device and offload cellular access network equipment. (The use of the term "access point" or AP herein generally refers to a central wireless communication device that acts as a hub for a wireless network to interconnect multiple wireless communication devices.) The wireless communication device can be configured to use WLAN connections, when available, over cellular connections, particularly for high data volume and high throughput rate transfers. Wireless cellular service providers are also adding services to permit WLAN voice connections and/or to seamlessly transfer voice connections between WLAN and cellular networks. Additionally, wireless communication devices serve as multimedia capable wireless interfaces to consume various forms of streaming media, to access information (such as via the Internet), to provide location based services (such as maps and directions), to interact via social media applications or to connect via higher quality audio and/or video (such as Facetime®) with others, to download applications and/or updates, etc. These advanced communication services benefit from higher data throughput, and as such, each generation of wireless communication device continues to add new features including supporting evolving wireless communication protocols that offer increased maximum throughput data rates. Higher data rates often require additional wireless circuitry and/or higher bandwidth communication that can result in increased power consumption by the wireless communication devices when configured to support higher throughput operation. Power savings, especially for limited battery reserve wireless communication devices, can be as important to users as higher throughput data rates.

The Institute of Electrical and Electronics Engineers (IEEE), which standardizes wireless local area network (WLAN) communication protocols, such as the 802.11 family of standards, provides for power save modes as part of the 802.11n and 802.11ac wireless communication protocols. For the 802.11n wireless communication protocol, a Spatial Multiplexing Power Save (SMPS) mode provides for reduced power consumption at a wireless communication device by decreasing the number of spatial streams communicated between the 802.11n compliant AP and the wireless communication device. While the Wi-Fi Alliance test plan mandates that IEEE 802.11n Wi-Fi certified devices, such as an 802.11n compliant AP, support the SMPS mode, many WLAN APs to which the wireless communication device can associate and communicate may be not Wi-Fi certified for 802.11n, and hence the wireless communication device cannot assume that the SMPS mode is supported by the WLAN AP.

SUMMARY

Apparatus and methods for configuring wireless circuitry of a wireless communication device to reduce power consumption by using a spatial multiplexing power save (SMPS) mode are disclosed. When associated with a multiple-input multiple-output (MIMO) capable wireless local area network (WLAN) access point (AP), the wireless communication device requests to switch configuration of the wireless circuitry from using a MIMO mode that includes at least two spatial streams for communication with multiple radio frequency (RF) receive chains active to a single-input single-output (SISO) mode that includes only one spatial stream and a single RF receive chain active. After sending a request message to the WLAN AP indicating the request to switch from the MIMO mode to the SISO mode, the wireless communication device monitors received packets following a guard interval to determine whether each packet uses multiple spatial streams or a single spatial stream. If all packets received use a single spatial stream, the wireless communication device switches to the SISO mode to conserve power. If at least one packet received uses multiple spatial streams, the wireless communication device remains in the MIMO mode. The wireless communication device repeats the request to switch from the MIMO mode of communication with the WLAN AP to the SISO mode of communication with the WLAN AP up to a maximum number of times, when previous requests do not successfully result in switching to the SISO mode, during an associated connection with the WLAN AP. In some embodiments, the SMPS mode and the request indicating to switch from the MIMO mode to the SISO mode are in accordance with an 802.11n wireless communication protocol. In some embodiments, the request, sent by the wireless communication device to the WLAN AP, indicating to switch from the MIMO mode to the SISO mode also indicates that the wireless communication device prefers to use a SISO mode with a single 20 MHz wide bandwidth spatial stream. After sending the request message to the WLAN AP, the wireless communication device monitors packets received from WLAN AP for the width of the spatial stream bandwidth to determine whether to use a single 20 MHz wide bandwidth spatial stream in a SISO mode or to use a 40 MHz wide, 80 MHz wide, or 160 MHz wide bandwidth with multiple spatial streams in a MIMO mode based at least in part on a bandwidth used for packets received from the WLAN AP after sending the request message to the WLAN AP.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 5 illustrates a table of example spatial stream configurations for various operational states of a wireless communication device, in accordance with some embodiments.

DETAILED DESCRIPTION

Figure 1:
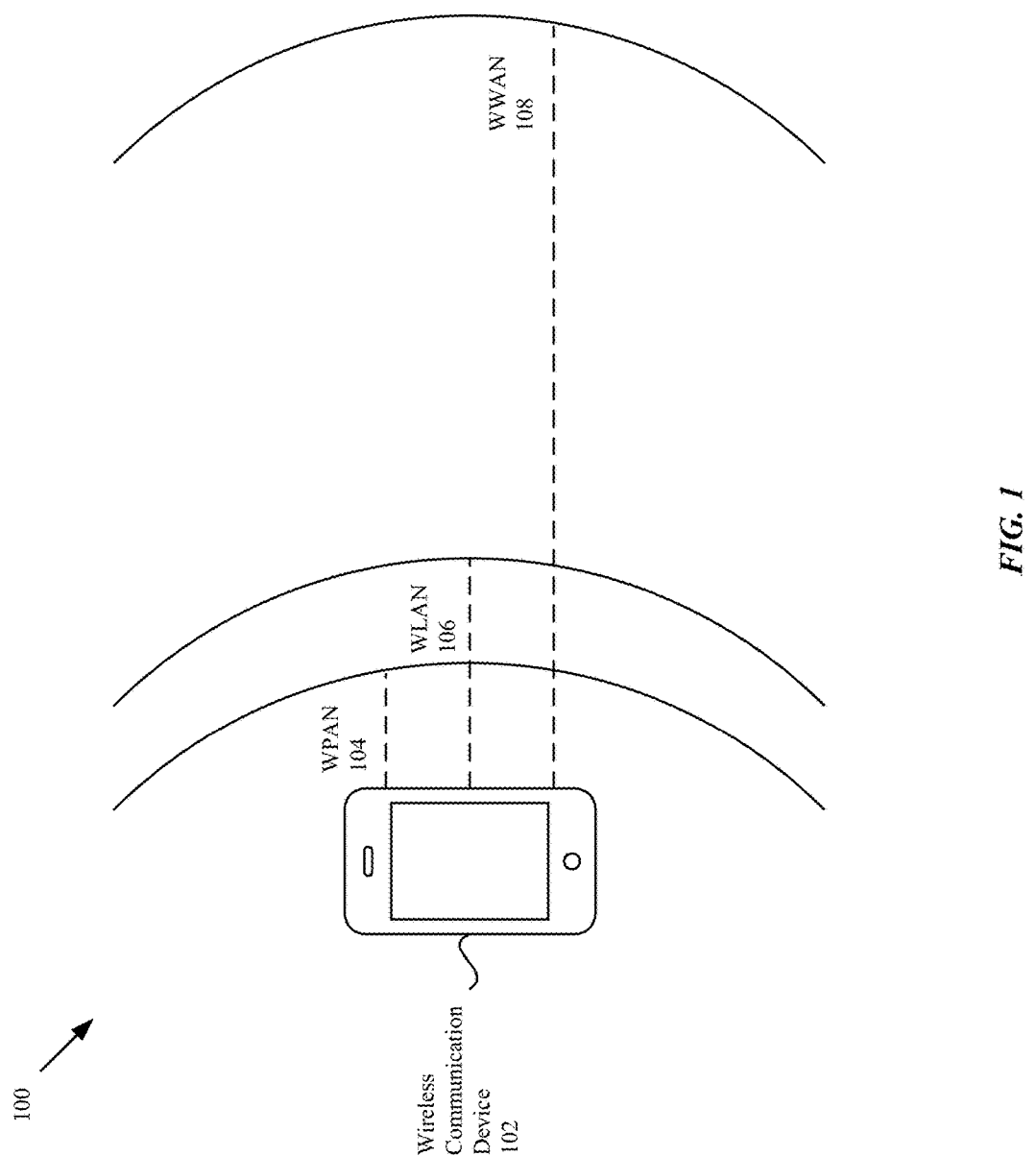
FIG. 1 illustrates a diagram of an example wireless communication device that supports multiple wireless communication protocols, in accordance with some embodiments.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," "user equipment" (UE), and "station (STA)" may be used interchangeably herein to describe one or more common consumer electronic devices that may be capable of performing procedures associated with various embodiments of the disclosure. In accordance with various implementations, any one of these consumer electronic devices may include: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can operate as part of a wireless communication system, which can include a set of client devices, which can also be referred to as stations (STAs), client wireless devices, or client wireless communication devices, interconnected to an access point (AP), e.g., as part of a WLAN, and/or to each other, e.g., as part of a WPAN and/or as part of an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. In some embodiments, the wireless communication device can include a Bluetooth® (or more generically a WPAN) wireless communication subsystem or radio that can implement a Bluetooth wireless communication protocol, such as developed and published by the Bluetooth Special Interest Group (SIG).

To support higher throughput data rates as well as receive diversity, an exemplary wireless communication device includes wireless circuitry that includes at least multiple radio frequency (RF) receive chains, which can each be independently enabled for higher performance or disabled for reduced power consumption. The wireless communication device can include multiple antennas that are spatially separated to provide at least two different independent communication paths for communication between the wireless communication device and an associated wireless AP. Signals received through each antenna can be processed by separate RF receive chains separately to provide higher data throughput, via spatial multiplexing when multiple spatial streams are transmitted by the wireless AP to the wireless communication device, and to provide receive diversity to improve a signal-to-interference-plus-noise ratio (SINR), when a single spatial stream is transmitted by the wireless AP to the wireless communication device. Each RF receive chain includes low-noise amplifiers to boost received signals and further circuitry is required to process, demodulate, and decode the boosted signals, thereby resulting in increased power consumption when receiving via multiple RF receive chains in the wireless communication device. In the reverse direction, multiple spatial streams transmitted by the wireless communication device to an associated wireless AP can require multiple RF transmit chains, each including associated RF wireless circuitry that consumes power when enabled, such as power amplifiers to boost signals before transmitting from the multiple antennas. The use of multiple spatial streams for communication between the wireless communication device and an associated AP, referred to herein as multiple-input multiple-output (MIMO) communication, can provide increased performance at the expense of increased power consumption and associated battery drain at the wireless communication device. Increased demand for higher data throughput services promotes the use of MIMO; however, many applications and/or operating states of the wireless communication device can perform well without MIMO, and as described further herein, the selective use of MIMO based on a combination of active applications and/or operating states of the wireless communication device can reduce power consumption by the wireless communication device and thereby increase battery life and the time required between charges. In particular, disabled RF receive chains unless warranted by an associated application or operating state can provide substantial power savings.

The 802.11n wireless communication protocol specifies a Spatial Multiplexing (SM) Power Save (PS) mode that reduces the number of active RF receive chains required at a wireless communication device. While in a static SMPS mode, the wireless communication device can expect to receive only a single spatial stream from the associated wireless AP, and thus unless required to maintain a stable connection with the associated wireless AP, such as when a received signal strength is below a strength threshold, the wireless communication device can power only a single RF receive chain to receive the single spatial stream from the associated wireless AP. While in a dynamic SMPS mode, the wireless communication device can transition from reception of a single spatial stream to reception of multiple spatial streams only in response to an indication for MIMO operation from the associated wireless AP. To change the receiver of the wireless communication device from using a single RF receive chain mode to using multiple RF receive chains, the wireless AP sends a Request To Send (RTS) frame using a single spatial frame to indicate that multiple RF receive chains should be enabled by the wireless communication device. A subsequent data frame is then sent using a number of parallel spatial streams. After the data frame is received, the wireless communication device returns to using a single spatial stream.

For limited data throughput rate applications, such as Wi-Fi voice or Facetime Audio which are isochronous applications with deterministic rates, multiple spatial streams provided by MIMO may not be required. For such applications, the wireless communication device can operate in a single spatial stream mode rather than a multiple spatial stream mode. Similarly, most background applications and/or WLAN maintenance tasks, such as scanning for access points, receiving beacon signals, can require only a single spatial stream mode. In some embodiments, applications can be considered to operate either in the foreground or the background, e.g., based on which application window the user has open and is using. High volume data transfer for an application, whether in the foreground or background, can warrant the use of multiple spatial streams, while low volume data transfer for an application can be assigned a single spatial stream only.

While multiple spatial streams, e.g., MIMO communications, require the use of multiple RF receive chains, a single spatial stream can also benefit from the use of multiple RF receive chains to provide increased performance via receive diversity. When a signal strength, such as a received signal strength indicator (RSSI) value falls below a strength threshold, the wireless communication device can be configured to use multiple RF receive chains to receive single spatial stream signals, unless reduced power consumption becomes paramount over communication link stability. Thus, under low RSSI conditions, the wireless communication device can be configured to use multiple RF receive chains to receive beacons and low volume background or foreground application data when not operating in a battery save mode (e.g., configured by a user of the wireless communication device via a user interface of the wireless communication device) or at a low battery level, (e.g., below a battery reserve threshold). When operating in a battery save mode or with a low battery level, the wireless communication device can be configured to use only one RF receive chain to receive single spatial stream data, beacons, and other signals from the associated wireless AP.

When a host/application processor for the wireless communication device enters a stand-by mode, with no active data communication occurring between the wireless communication device and an associated wireless AP, excepting minimal traffic, such as keep-alive packets, to maintain the connection with the associated wireless AP, the wireless communication device can default to operating with a single RF receive chain. The wireless communication device can return to operating with (or enabling for operation) multiple RF receive chains upon an indication from the associated wireless AP of downlink (AP to wireless communication device) traffic, such based on a bit in a traffic indication map (TIM). After data transmission or reception, when there is a period of inactivity, which can be based on expiration of a timer set after completion of data transmission or reception, the wireless communication device can switch to single RF receive chain operation (if not already in such a mode). In some embodiments, the wireless communication device can switch to single RF receive chain operation when only background data communication occurs and no foreground data communication occurs. In some embodiments, when background data communication requires a high volume transfer, e.g., to receive an attachment or download a file greater than a size threshold, such as greater than 1 MB, then the wireless communication device can switch to enable multiple RF receive chains to support MIMO transfer (if also supported by the wireless AP). When the wireless communication device is associated with a wireless AP that only supports single spatial streams, the wireless communication device can be configured to operate only with a single RF receive chain when the RSSI exceeds a strength threshold, and with multiple RF receive chains when the RSSI does not exceed the strength threshold. When the wireless communication device scans for an access point with which to associate (when in an unassociated state), only one RF receive chain can be enabled, at least when scanning for previously discovered access points, such as those in an auto-join list maintained by the wireless communication device.

Wireless access points that operate using an 802.11n wireless communication protocol may not necessarily support the SMPS mode. In some embodiments, a wireless communication device determines whether an associated wireless AP supports an SMPS mode by monitoring frames communicated by the wireless AP after sending a message to the wireless AP, the message indicating that the wireless communication device plans to switch to using a single RF receive chain, and thus single-input single-output (SISO) rates using only a single spatial stream for communication with the wireless communication device can be required. While the wireless AP can acknowledge reception of the message from the wireless communication device, e.g., by sending an ACK, the wireless AP may not honor the request to operate in a SISO mode with SISO rates only. Following transmission of the message, the wireless communication device can keep multiple RF receive chains active for a guard interval period of time, e.g., as required to allow for the wireless AP to transition from sending in a MIMO mode/rate to sending in a SISO mode/rate. After the guard interval period of time, the wireless communication device can monitor an additional set of packets received from the wireless AP to ascertain whether the wireless AP has switched from a MIMO mode/rate to a SISO mode/rate. The guard interval period of time can be sufficiently long to ensure that the wireless AP will have switched if honoring the request to switch. If all packets in the additional set of packets received from the wireless AP after the guard interval period of time are transmitted with a SISO mode/rate, the wireless communication device switches from using multiple RF receive chains for MIMO to using a single RF receive chain for SISO (or at least to a SISO rate with multiple RF receive chains for receive diversity only if required based on a low RSSI that falls below a strength threshold). If any packet in the additional set of packets received from the wireless AP are transmitted using a MIMO mode/rate, the wireless communication device continues to use multiple RF receive chains in a MIMO mode. In some embodiments, the wireless communication device repeats transmission of the request to switch from a MIMO mode/rate to a SISO mode/rate up to a threshold number of retries, e.g., up to three successive attempts to switch from MIMO to SISO, and when all three retries fail, e.g., at least one MIMO packet received after each guard interval period following the request to switch, the wireless communication device can continue to use multiple RF receive chains while associated with the wireless AP. The wireless communication device will only switch to a SISO mode/rate when all packets received after a guard interval period of time that follows a request to switch using a SISO mode/rate. When operating in a SISO mode/rate, the wireless communication device can enable multiple RF receive chains to provide for receive diversity when the RSSI falls below a strength threshold. Otherwise, when operating in a SISO mode/rate, the wireless communication device can enable only a single RF receive chain to minimize power consumption.

FIG. 1 illustrates a diagram 100 of a wireless communication device 102 configurable to communicate using multiple wireless communication protocols. The wireless communication device 102 can include wireless circuitry configurable to communicate with a wireless wide area network (WWAN) 108, such as a cellular wireless network of a wireless service provide, using one or more WWAN wireless communication protocols. The wireless communication device 102 can also include wireless circuitry configurable to communicate with a wireless local area network (WLAN) 106, such as a Wi-Fi network, using one or more WLAN wireless communication protocols. The range of coverage of a WLAN network is typically shorter than a range of coverage of a WWAN network. The wireless communication device 102 can also include wireless circuitry configurable to communicate with a wireless personal area network (WPAN) 104, such as a Bluetooth pico-net, which provides a narrow range, relatively low bandwidth and low data rate connection, such as for interconnecting peripheral wireless devices to the wireless communication device 102, which acts as a central wireless device. In some embodiments, the wireless communication device 102 can be configured to use WLAN connections to a WLAN 106 preferably over a WWAN connection to a WWAN 108, at least for packetized data connections or connections that support high bandwidth and/or high data throughput applications. In some embodiments, the wireless communication device 102 can be configured to communicate with a multiple-input multiple-output (MIMO) capable AP of the WLAN 106 based on a combination of active applications, data transfer requirements, a battery level, physical layer performance metrics, or wireless network maintenance functions in use. In some embodiments, the wireless communication device 102 includes wireless circuitry that includes multiple radio frequency (RF) receive chains and multiple RF transmit chains and determines a configuration of the number of RF receive chains and/or RF transmit chains to balance high data throughput requirements with power savings.

Figure 2:
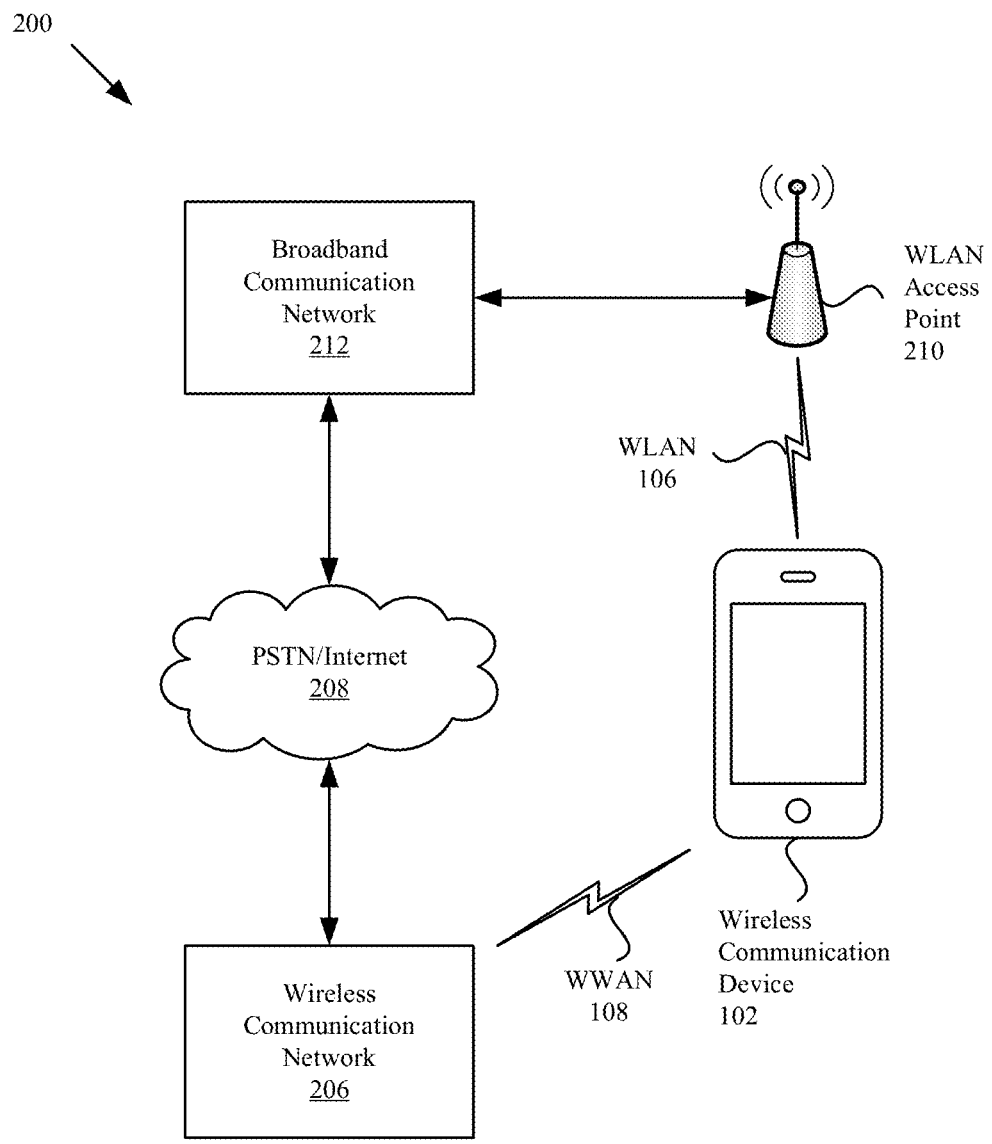
FIG. 2 illustrates a diagram of an example wireless communication system that includes a wireless communication device connected via multiple wireless communication protocols to different wireless communication networks, in accordance with some embodiments.

FIG. 2 illustrates a diagram 200 of a wireless communication system that includes the wireless communication device 102 configurable to communicate individually or together with a wireless communication network 206 via a WWAN 108, such as with a cellular wireless network through a cellular wireless access network of a wireless service provider, and a broadband communication network 212 via a wireless access point (AP) 210 through a WLAN 106, such as a Wi-Fi network. Each of the wireless communication network 206 and the broadband communication network 212 can be connected to the Internet and/or the public switched telephone network (PSTN), which are indicated jointly as the PSTN/Internet 208. The Internet can provide packet switched connections to packet data based services, while the PSTN can provide circuitry switched connections to circuit switched based service, such as circuit switched voice connections. As the wireless AP 210 is typically connected to the broadband communication network 212 by a high bandwidth backhaul connection and data transfer via the WLAN 106 is usually not subject to subscription limits as usually applied to cellular data services, the wireless communication device 102 can be configurable to prefer data connections via the WLAN 106, when available, over data connections via the WWAN 108. In some embodiments, wireless service providers can provide comparable services, such as voice connections, through the WWAN 108 or the WLAN 106 to the wireless communication device, e.g., Wi-Fi voice. In some embodiments, the wireless communication device 102 can be configurable to provide voice, video, data, messaging, or other packet based services through the WLAN 106 and/or the WWAN 108. In some embodiments, packet based data connections can be seamlessly transferred between the WLAN 106 and the WWAN 108 to provide continuity of connections for the wireless communication device 102, thereby not interrupting active connections and also offloading WWAN connections to WLAN connections when available for higher data throughput and/or more cost effective data transfer for the user of the wireless communication device 102. In some embodiments, the wireless communication device 102 dynamically adapts a connection with the WLAN access point 210 based on a combination of data throughput requirements for active applications, operating states of the wireless communication device 102, a battery level, or physical layer performance metrics. In some embodiments, the wireless communication device 102 switches between a MIMO mode and a single-input single-output (SISO) or single-input multiple-output (SIMO) mode for the connection with the WLAN AP 210. In some embodiments, the wireless communication device 102 dynamically adjusts the number of RF receive chains and/or the number of RF transmit chains enabled for communication with the WLAN AP 210.

Figure 3:
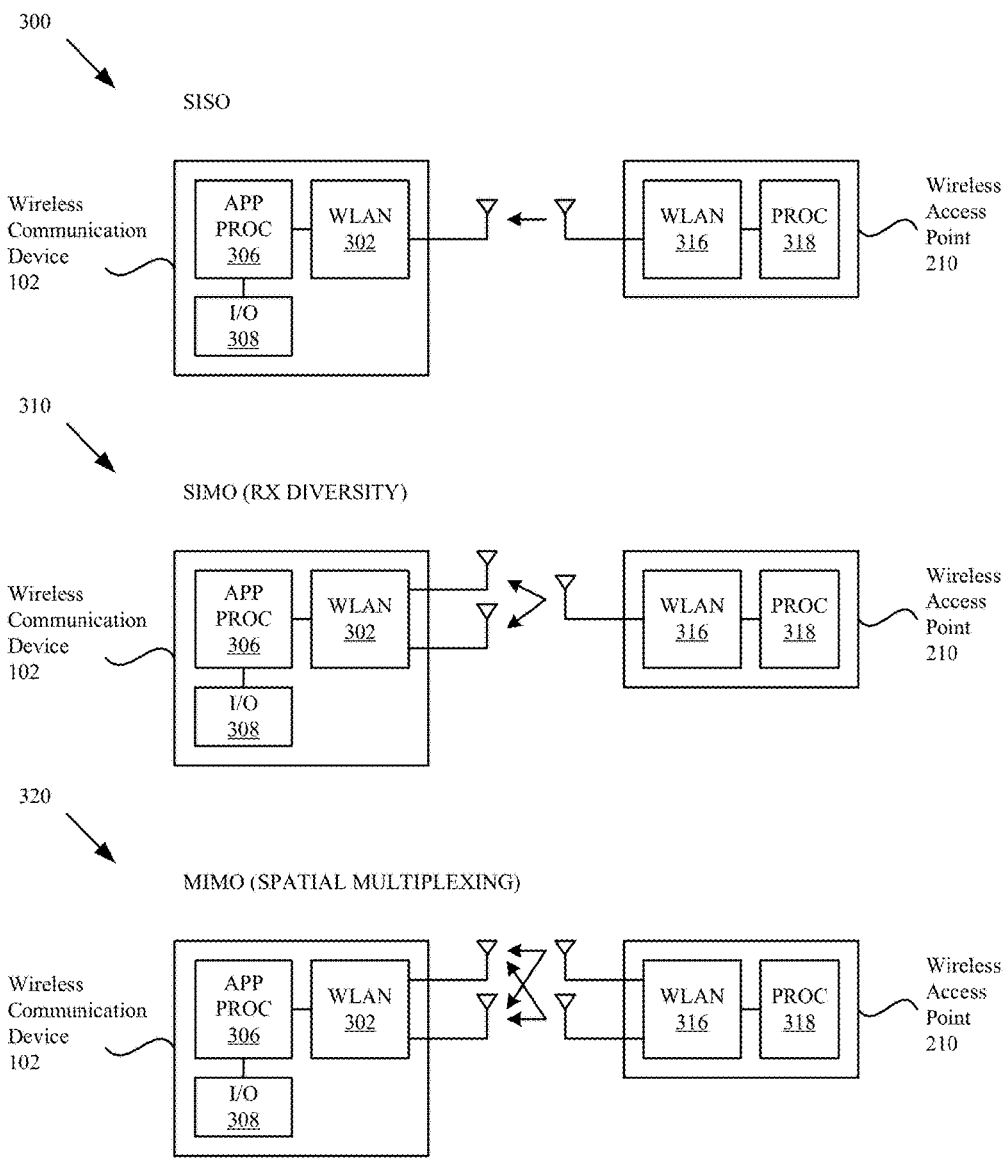
FIGS. 3 and 4 illustrates diagrams of example spatial stream configurations for communication between a wireless access point (AP) and a wireless communication device, in accordance with some embodiments.

FIG. 3 illustrates diagrams of several different configurations for communication between a wireless access point 210 and a wireless communication device 102. The wireless communication device 102 can include WLAN wireless circuitry 302, which can include both digital and analog circuitry for processing wireless signals for communication with the wireless access point 210 in accordance with one or more wireless communication protocols. The wireless communication device can also include one or more host or application processors 306 that manage active applications on the wireless communication device 102. Further, the wireless communication device 102 can includes an input/output (I/O) element 308, which can provide for accepting external inputs, such as via a touch-based interface and/or a voice-based interface, and for displaying external outputs, such as via a display of the wireless communication device 102. A user of the wireless communication device 102 can interact with, such as responding to notifications or providing settings, via the I/O element 308. The wireless access point 210 can include one or more processors 318 coupled to WLAN wireless circuitry 316 that can be configurable to communicate with one or more wireless communication devices 102. The wireless access point 210 can communicate with different wireless communication devices 102 using different configurations of the WLAN wireless circuitry 316.

In a first configuration 300, the wireless access point 210 can be configured to communicate with the wireless communication device 102 using a single-input single-output (SISO) mode, which can include a set of SISO data rates applicable to the SISO mode. In the SISO mode, the wireless communication device 102 can receive from and/or transmit to the wireless AP 210 using a single spatial stream. The wireless communication device 102 can receive a single spatial stream in the SISO mode from the wireless AP 210 using a single RF receive chain and can transmit a single spatial stream in the SISO mode to the wireless AP 210 using a single RF transmit chain. By limiting the WLAN wireless circuitry 302 in the wireless communication device 102 to use a single RF transmit chain and a single RF receive chain the wireless communication device 102 can conserve power, as additional RF transmit chains and/or RF receive chains can be disabled and power down while operating in the SISO mode. The SISO mode can provide a power efficient mode of operation for the wireless communication device, while limiting data throughput rates to SISO rates.

In a second configuration 310, the wireless access point 210 can be configured to communicate with the wireless communication device 102 using a single spatial stream, e.g., at SISO data rates, while the wireless communication device can receive the single spatial stream using multiple RF receive chains. The single-input multiple-output (SIMO) mode can provide for increased signal-to-interference-plus-noise ratio (SINR) values at the wireless communication device 102, as the multiple RF receive chains can each provide a separate signal that can be combined together, e.g., using a maximal ratio combining (MRC) algorithm, to improve performance for signal reception. The SIMO mode can also be referred to as using receive (RX) diversity by the wireless communication device 102. The SIMO mode can be useful to improve connection stability under adverse signal conditions, e.g., based on one or more physical layer performance metrics that can indicate weak reception. In some embodiments, the wireless communication device 102 uses the SIMO mode selectively based on one or more physical layer performance metrics measured at the wireless communication device 102, e.g., based on a received signal strength indicator (RSSI) value relative to a signal strength threshold. When the RSSI value falls below the signal strength threshold (or another set of comparable physical layer performance metrics that indicate weak signal strength and/or weak signal quality), the wireless communication device 102 can be configured to enable multiple RF receive chains to improve receive signal performance and thereby improve connection stability between the wireless communication device 102 and the wireless AP 210. The SIMO (or RX diversity) mode can reduce the effects of signal fading when separate communication channel paths between the wireless AP 210 and the wireless communication device 102 received by spatially separated antennas on the wireless communication device 102 are uncorrelated, e.g., fading may occur on only one communication channel path.

In a third configuration 320, the wireless access point 210 can be configured to communicate with the wireless communication device 102 using multiple spatial streams in a multiple-input multiple-output (MIMO) mode, e.g., at MIMO data rates, and the wireless communication device 102 can be also configured to transmit to and/or receive from the wireless AP 210 the multiple spatial streams using multiple RF transmit chains and/or multiple RF receive chains. The multiple spatial streams provide for transferring higher data rates using parallel data streams through each spatial communication path. The MIMO mode can also be referred to as a spatial multiplexing (SM) mode. As shown in the third configuration 320, the wireless communication device 102 can receive each separate spatial stream through different antennas, thus providing at least four different communication paths through which the multiple spatial streams are communicated. The 802.11n wireless communication protocol provides for up to four different spatial streams with up to four separate RF transmit chains and four separate RF receive chains. Communication of each spatial stream can occupy a bandwidth of either 20 MHz or 40 MHz. The 802.11ac wireless communication protocol expands the number of parallel spatial streams to up to eight, with accompanying eight RF transmit chains and/or eight RF receive chains allowed. Each spatial stream can be communicated using a bandwidth of 20 MHz, 40 MHz, 80 MHz, or 160 MHz. Higher numbers of parallel spatial streams require higher numbers of RF transmit chains and/or RF receive chains, which can increase power consumption when operating in a MIMO mode. Similarly higher bandwidth spatial streams can also require more RF signal processing, which can also increase power consumption. Based on application data throughput requirements and/or based on requirements for different wireless communication protocol maintenance functions, such as when associating to and/or scanning for access points, as well as a battery level, the wireless communication device 102 can determine whether to operate in a MIMO mode at MIMO rates, in a SIMO mode at SISO rates, or in a SISO mode at SISO rates to balance data throughput with power consumption by the wireless communication device 102.

In some embodiments, a request, sent by the wireless communication device 102 to the WLAN AP 210, indicates a preference of the wireless communication device 102 to switch from the MIMO mode to the SISO mode and also indicates that the wireless communication device 102 prefers to use a SISO mode with a single 20 MHz wide bandwidth spatial stream. After sending the request message to the WLAN AP 210, the wireless communication device 102 monitors packets received from WLAN AP 210 for the width of the spatial stream bandwidth used by the packets to determine whether to use a single 20 MHz wide bandwidth spatial stream in a SISO mode, as requested, or to use a 40 MHz wide, 80 MHz wide, or 160 MHz bandwidth with multiple spatial streams in a MIMO mode based at least in part on a bandwidth used by the packets received from the WLAN AP 210 after sending the request message to the WLAN AP 210.

Figure 4:
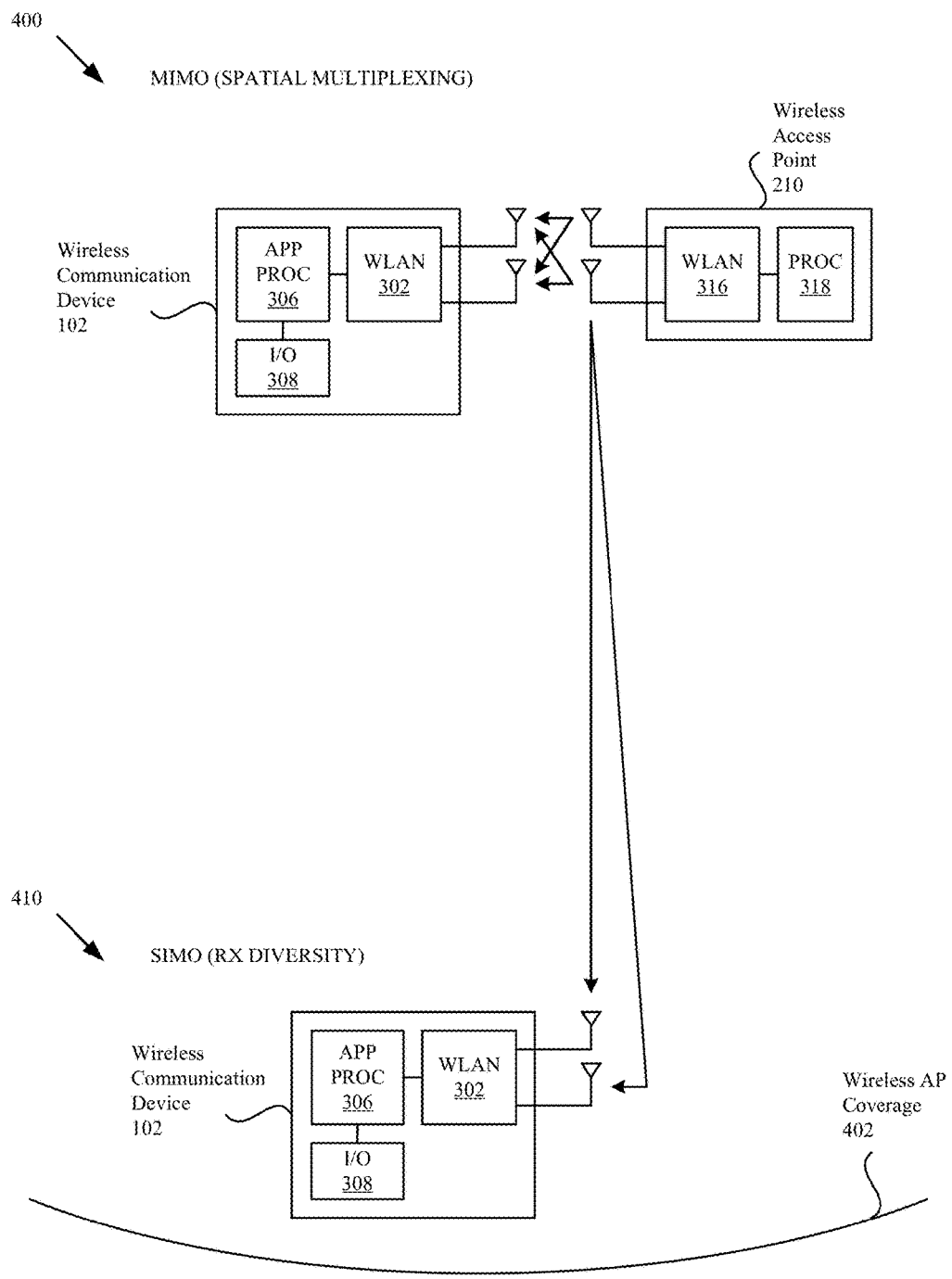

FIG. 4 illustrates diagrams 400/410 of a wireless communication device 102 communicating with a wireless access point 210 using two different modes, e.g., MIMO (spatial multiplexing) or SIMO (receive diversity), which each use multiple RF receive chains, but for different purposes. In the MIMO (spatial multiplexing) mode as shown in diagram 400, the wireless communication device 102 can receive multiple spatial streams from the wireless access point 210 at MIMO rates, which can be higher than SISO rates, particularly when a signal strength and/or signal quality receive by the wireless communication device 102 from the wireless access point 210 exceeds a strength or quality threshold. For example, when the wireless communication device 102 operates close to and/or with minimal obstruction for RF signals from the wireless access point 210 (and/or with a power boost mode from the wireless access point 210), the wireless communication device 102 can be configured to operate in a MIMO mode to provide higher throughput data rates. In some embodiments, the use of a MIMO mode can also depend on the wireless communication device 102 state, such as what operations are occurring and/or what applications are active and/or a battery level, to justify the use of MIMO mode in view of higher power consumption that can occur while in the MIMO mode. Alternatively, in the SIMO (receive diversity) mode as shown in diagram 410, the wireless communication device 102 can receive at SISO rates a single spatial stream from the wireless access point 210 using multiple RF receive chains to boost the signal strength/quality (when combining RF receive signals, such as using MRC algorithms.) The wireless communication device 102 can operate in the SIMO mode when receive signal strength and/or receive single quality indicate that connection stability may be compromised, e.g., when operating in an obstructed position and/or at the edge of the coverage range for the wireless access point 210. The wireless communication device 102 can enable multiple RF receive chains to boost performance, at least when permitted based on a sufficient battery level and not operating in a power reduced mode.

FIG. 5 illustrates a table 500 listing a correspondence between different operating modes, e.g., MIMO, SIMO, and SISO, for a connection between a MIMO capable wireless communication device 102 and a MIMO capable wireless AP 210, to a set of operational states of the MIMO capable wireless communication device 102. Depending on its operational state, the MIMO capable wireless communication device 102 can be configured to use a MIMO mode (with multiple spatial streams and multiple RF receive chains active), a SISO mode (with a single spatial stream and a single RF receive chain active), or a SIMO mode (with a single spatial stream and a single RF receive chain active).

When unassociated with a WLAN access point 210, the wireless communication device 102 can scan for available WLAN access points 210 with which to connect. As beacon signals transmitted by WLAN access points 210 can use single spatial streams only, the wireless communication device 102 can forego using a MIMO mode during unassociated scanning. In some embodiments, the wireless communication device 102 can use a single RF receive chain or multiple RF receive chains to process beacon signals from wireless access points. In some embodiments, the wireless communication device 102 can be configured to use a single RF receive chain when scanning for a WLAN access point 210 indicated by a user, e.g., based on input provided by the user via the I/O element 308 of the wireless communication device 102. In addition, the wireless communication device 102 can also be configured to use a single RF receive chain when scanning for a previously located WLAN access point 210, e.g., based on a list of WLAN access points for which connection information is stored in the wireless communication device 102 based on a previous connection, such as in an auto join list of WLAN access points 210. In some embodiments, WLAN access points 210 in the auto join list can be included in the auto join list only when a receive signal strength measured by the wireless communication device 102 exceeds a strength threshold (and thus multiple RF receive chains may not be required to acquire the beacon signals from the WLAN access point 210 in the auto join list). In some embodiments, the wireless communication device 102 can be configured to use multiple RF receive chains when performing a location based scan for WLAN access points 210, such as when seeking to locate previously undiscovered WLAN access points 210. The wireless communication device 102 can use multiple RF receive chains to improve reception when performing the location based scan. Thus, when performing unassociated scans, the wireless communication device 102 can be precluded from using a MIMO mode and can selectively use one or multiple RF receive chains to scan for WLAN access points 210.

When associating with a located WLAN access point 210, the wireless communication device 102 can communicate using a SISO mode (with a single spatial stream and one RF receive chain enabled) for the association process, except when advertising to the WLAN access point 210 its own MIMO capability, which can be communicated using multiple spatial streams to the WLAN access point 210. In some embodiments, the wireless communication device 102 can also use the MIMO mode to receive an indication that the WLAN access point 210 also supports the MIMO mode. Other than indicating a MIMO capability to or determining a MIMO capability of the WLAN access point 210, the wireless communication device 102 can use a SISO mode during association.

While associated with the WLAN access point 210, the wireless communication device 102 can enter a sleep state, such as operating in a wake on wireless (WoW) mode or a lower power associated sleep (LPAS) mode, which can provide for reduced power consumption by the wireless communication device 102 when there is no active data communication between the wireless communication device 102 and the WLAN access point 210, excepting keep-alive packets. While in an associated sleep operational mode, the wireless communication device 102 can operate SISO rates with a single spatial stream only, waking to receive beacon signals and/or other signaling messages transmitted by the WLAN access point 210 using a single spatial stream. When physical layer performance metrics indicate that the connection with the WLAN access point 210 is marginal, e.g., when signal strength and/or signal quality falls below respective signal strength or signal quality thresholds, the wireless communication device 102 can activate multiple RF receive chains to receive the beacons or signaling messages from the WLAN access point 210. In some embodiments, when entering an associated sleep mode, the wireless communication device 102 indicates to the WLAN access point 210 to switch to SISO rates, such as provided for by the SM power save mode of 802.11n. In some embodiments, when entering the associated sleep mode, the wireless communication device 102 also indicates to the WLAN access point 210 to reduce the bandwidth used for the single spatial stream, e.g., to 20 MHz as provided for by the power save modes of 802.11ac. In some embodiments, while operating in the associated sleep mode, the wireless communication device 102 wakes to transmit keep-alive packets, to receive push notifications from the WLAN access point 210, or to preform other background tasks that exchange data with the WLAN access point 210. Such background tasks can be limited to using SISO rates only, particularly when the data exchange requires a relatively low data throughput rate or to transfer a relatively small data file (e.g., less than 1 MByte). The wireless communication device 102 can receive background data using a single RF receive chain when physical layer performance metrics indicate a stable connection, such as when a receive signal strength indictor (RSSI) level exceeds a signal strength threshold value, or using multiple RF receive chains when physical layer performance metrics indicate a marginal connection, such as when the RSSI level falls does not exceed the signal strength threshold value.

While associated with the WLAN access point 210, the wireless communication device 102 can scan for alternative access points with which to associate and connect. In an associated scanning mode, the wireless communication device 102 can be configured to receive beacon signals from other WLAN access points 210 at SISO rates using a single spatial stream and processed using a single RF receive chain. The wireless communication device 102 can be configured to not use multiple RF receive chains to receive beacon signals from other WLAN access points 210 when associated with a WLAN access point 210 and performing a scan operation, and thus can be configured to not use a MIMO mode or a SIMO mode for associated scanning.

The wireless communication device 102 can also differentiate between applications that are transferring data (or may be seek to transfer data) as background applications or foreground applications. Information about whether an application operates in the foreground or background can be determined by the host/application processor 306 of the wireless communication device 102 in some embodiments. For an application that requires high data throughput and/or transfer of a large file in the foreground, the wireless communication device 102, when associated with a MIMO capable WLAN access point 210 can be configured to use MIMO rates in a MIMO mode with multiple spatial streams and multiple RF receive chains enabled. For an application that does not require high data throughput and/or transfers a small file in the foreground, the wireless communication device 102 can be configured to use SISO rates with one spatial stream, using either a single RF receive chain or multiple RF receive chains based on physical layer performance metrics. For example, for low RSSI values (below a signal strength threshold value), the wireless communication device 102 can operate in a SIMO mode with a single spatial stream and multiple RF receive chains, while for high RSSI values (above the signal strength threshold value), the wireless communication device 102 can operate in a SISO mode with a single spatial stream and a single RF receive chain.

In some embodiments, the wireless communication device 102 can use the same configurations for background data applications as for foreground data applications, e.g., high data throughput transfer requirements of the application, whether operating in the background or foreground, can indicate using a MIMO mode, while low data throughput transfer requirements of the application can indicate using a SISO or SIMO mode, the choice of which depends on physical layer performance metrics. In some embodiments, independent of whether the application requires high data rate throughput or high volume (e.g., large file size) transfers, when operating in the background (and no high volume/data rate foreground applications active), the wireless communication device 102 can be configured to use either a SISO mode or a SIMO mode and to not use a MIMO mode.

Whether to enable multiple RF receive chains to support a MIMO mode at MIMO rates or to provide for higher SINR under adverse receive signal conditions to support a SIMO mode at SISO rates, the wireless communication device 102 can be configured to always use a SISO mode at SISO rates when configured in a battery save (or equivalent power conservation) mode and/or when a battery level falls below a low battery threshold level. A low battery level state or a battery save mode can take precedence for configuration of the RF receive chains independent of any other states of the wireless communication device 102. Thus, a wireless communication device 102 in active communication and/or associating and/or scanning and/or listening for beacons and/or transferring data (whether high or low volume) can be configured to use the SISO mode with one spatial stream only and one RF receive chain only to reduce power consumption when a battery level falls below the low battery threshold level and/or when a user configures the wireless communication device 102 to operate in a power save mode (e.g., to prioritize power savings over data throughput).

In some embodiments, upon waking from an associated sleep state to an active state based on a user input to activate an application, the wireless communication device 102 can be configured to use a MIMO mode at MIMO rates matched to a higher bandwidth (if applicable for the associated WLAN access point 210) enabling the use of two spatial streams and two RF receive chains if the activated application is expected to use a higher data rate throughput or transfer a large volume data file. For example, the wireless communication device 102 can be associated with the WLAN access point 210 and in a sleep state, e.g., after a period of inactivity that causes the wireless communication device to conserve power and enter the sleep state. A representative indication of the wireless communication device 102 being in the sleep state can be when a display screen of the device is in a locked state. The wireless communication device 102 can receive a push notification from the WLAN access point 210, such as for an email application or a social media application. The user of the wireless communication device 102 can respond to the push notification (which can be displayed to the user via the I/O element 308 of the wireless communication device 102) by unlocking the display (e.g., to exit the sleep state and respond to the push notification.) The user can subsequently launch an associated application, such as an email application or a social media application, which can benefit from a high data throughput connection and/or can seek to download and/or upload a high volume file (such as a photo). The wireless communication device 102 can be configured to determine which application launched and/or whether an associated file transfer to the WLAN access point 210 or from the WLAN access point 210 requires a high data throughput that can be provided by operating in a MIMO mode, at MIMO rates, with multiple RF transmit chains (for transfer of data to the WLAN access point 210) or with multiple RF receive chains (for reception of data from the WLAN access point 210). Alternatively when the push notification is associated with a low throughput data rate application, such as with an incoming Wi-Fi voice connection or with a Facetime audio connection, the wireless communication device 102 can be configured to exit the sleep state and use a SISO mode at SISO rates (or a SIMO mode at SISO rates depending on physical layer performance metrics).

The wireless communication device 102, in some embodiments, can be configured to maintain a MIMO policy that indicates under what conditions to operate in a MIMO mode, with MIMO rates, multiple spatial streams, and multiple RF receive chains, in a SISO mode, with SISO rates, a single spatial stream, and a single RF receive chain, or in a SIMO mode, with SISO rates, a single spatial stream, and multiple RF receive chains. In some embodiments the MIMO policy can associate various applications with different preferred modes, or with a prioritization of modes when such an application is active. In some embodiments, when at least one foreground application is active that prefers a MIMO mode, and the WLAN access point 210 supports the MIMO mode, the wireless communication device 102 can be configured to use the MIMO mode, unless configured for a battery save mode or operating with a low battery level. In some embodiments, the wireless communication device 102 can operate using multiple RF receive chains (whether in a MIMO or SIMO mode) based on one or more physical layer performance metrics that indicate a weak or unstable connection between the wireless communication device 102 and the associated WLAN access point 210. For example, with low RSSI levels below a signal strength threshold value, the wireless communication device 102 can be configured to use multiple RF receive chains, unless operating in a battery save mode or with a low battery level.

Representative applications that can benefit from and in some embodiments require that the wireless communication device 102 operate in a MIMO mode at MIMO rates, when available with a MIMO capable WLAN access point 210, include video streaming, high volume foreground downloads, high volume foreground uploads, multimedia messaging, video conferencing, and video connections (such as Facetime). Representative applications that may not require the wireless communication device 102 operate in a MIMO mode at MIMO rates and can preferably use SISO rates in a SISO mode or SIMO mode include audio streaming, low volume downloads, background data communication, email (with limited attachments), push notifications, pull notifications, and voice connections (such as Wi-Fi voice or Facetime Audio). High data rate downloads or uploads by the wireless communication device 102 can provide for shorter transmissions (less time to transfer the files) and thereby provide more opportunities for additional wireless communication devices 102 to access the shared WLAN 106 provided by the WLAN access point 210. Battery power conservation, and therefore operating with a SISO mode, such as when configured to prioritize power savings by a user or when a battery level drops below a low battery threshold, can override any application preference to use a MIMO mode. In some embodiments, transfers in a MIMO mode are allowed to complete before switching to a SISO mode when a battery level falls below the low battery threshold and/or when the user configures the wireless communication device 102 to a battery save mode.

Figure 6:
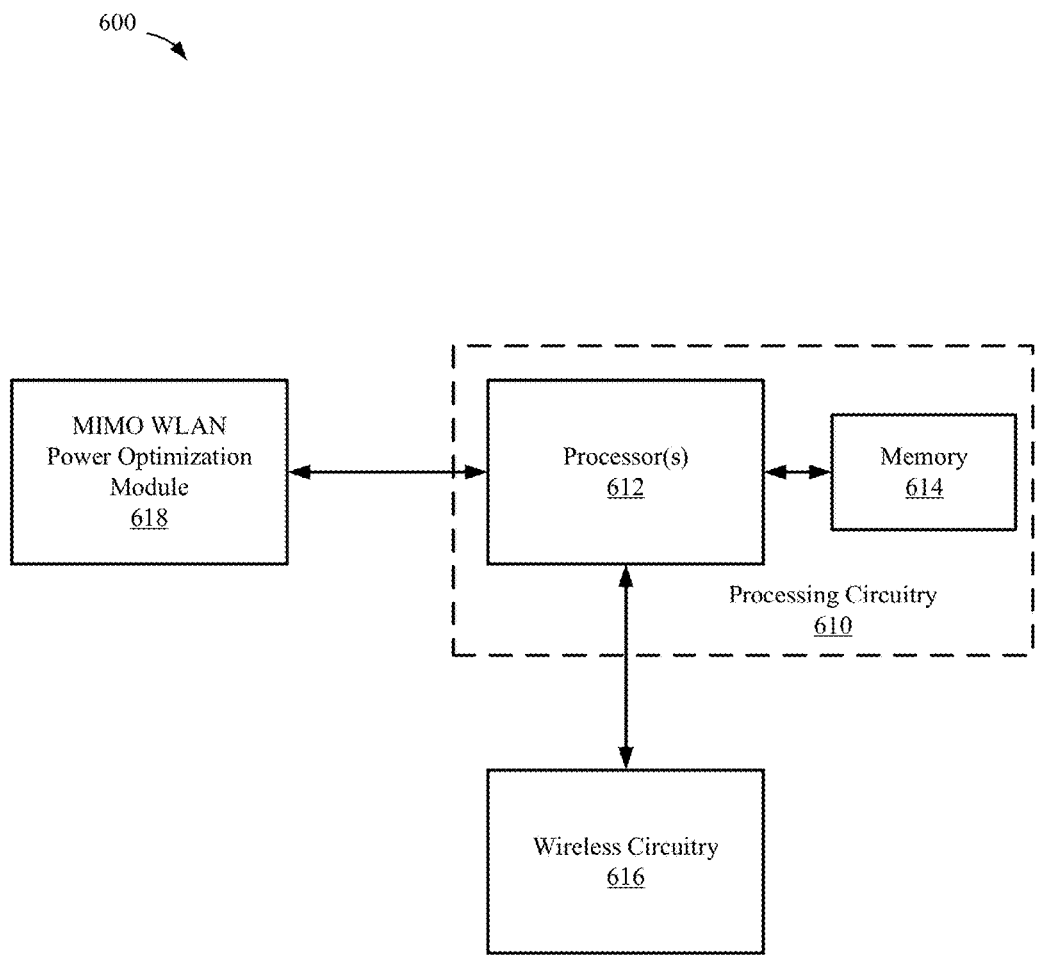
FIG. 6 illustrates a diagram of an example set of components included in a wireless communication device, such as a user equipment (UE) that includes wireless local area network (WLAN) capabilities, in accordance with some embodiments.

FIG. 6 illustrates an example block diagram 600 of components of a wireless communication device 102 including a MIMO WLAN power optimization module 618 communicatively couple with processing circuitry 610, which includes one or more processors 612 and a memory 614, and wireless circuitry 616 including antennas, transmit chains, receive chains, which can be paired as transceivers, and other processing elements in the wireless circuitry 616 to convert between digital data and analog wireless RF signals. In various configurations, the wireless communication device 102 can use the MIMO WLAN power optimization module 618 in conjunction with the processing circuitry 610 and the wireless circuitry 616 to determine in which mode to configure the wireless circuitry 616 to scan for, associate with, and/or communicate with a WLAN access point 210, e.g., using a MIMO mode at MIMO rates, a SISO mode at SISO rates, or a SIMO mode at SISO rates. In some embodiments, the MIMO WLAN power optimization module 618 determines in which mode to operate based on a combination of active foreground applications/processes, active background applications/processes, display states (e.g., locked vs. unlocked), WLAN maintenance operations, physical layer performance metrics (e.g., weak or strong signal strength), battery level, or user settings (e.g., power save mode).

The processing circuitry 610 can be configured to perform and/or control performance of one or more functionalities of the wireless communication device in accordance with various implementations, and thus, the processing circuitry 610 can provide functionality for performing various application and/or process monitoring and adjustment of wireless circuitry configurations, such as number of RF receive chains to use for different operating modes. The processing circuitry 610 may further be configured to perform data processing, application execution, and/or other device functions according to one or more embodiments of the disclosure.

The set of components of the wireless communication device 102 illustrated in FIG. 6, or portions or components thereof, such as the processing circuitry 610, can include one or more chipsets, which can respectively include any number of coupled microchips thereon. The processing circuitry 610 and/or one or more other components of the wireless communication device 102 may also be configured to implement functions associated with various signaling and wireless circuitry control procedures of the disclosure using multiple chipsets. In some scenarios, the wireless communication device 102 may be associated with a WLAN access point 210 and configured to use one or more RF transmit chains and one or more RF receive chains for communication between the wireless communication device 102 and the WLAN access point 210 in various modes, such as in a MIMO, SISO, or SIMO mode as described herein.

In various scenarios, the processing circuitry 610 of the wireless communication device 102 may include one or more processor(s) 612 and a memory component 614. The processing circuitry 610 may be in communication with, or otherwise coupled to, wireless circuitry 616 configurable to communicate in accordance with one or more WLAN wireless communication protocols, such as 802.11n and/or 802.11ac.

In some embodiments, the processor(s) 612 may be configured in a variety of different forms. For example, the processor(s) 612 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 612 of the wireless communication device 102 can be coupled to and/or configured in operative communication with each other, and these components may be collectively configured to perform one or more procedures as described further herein.

In some implementations, the processor(s) 612 can be configured to execute instructions that may be stored in the memory 614, or that can otherwise be accessible to the processor(s) 612 in some other device memory. As such, whether configured as, or in conjunction with, hardware or a combination of hardware and software, the processor(s) 612 of the processing circuitry 610 may be capable of performing operations according to various implementations described herein, when configured accordingly.

In various embodiments, the memory 614 of the processing circuitry 610 may include multiple memory devices that can be associated with any common volatile or non-volatile memory type. In some scenarios, the memory 614 may be associated with a non-transitory computer-readable storage medium that can store various computer program instructions which may be executed by the processor(s) 612 during normal program executions. In this regard, the memory 614 can be configured to store information, data, applications, instructions, or the like, for enabling the wireless communication device to carry out various functions in accordance with one or more embodiments of the disclosure. In some implementations, the memory 614 may be in communication with, and/or otherwise coupled to, the processor(s) 612 of the processing circuitry 610, as well as one or more system busses for passing information between and amongst the different device components of the wireless communication device.

It should be appreciated that not all of the components, device elements, and hardware illustrated in and described with respect to the set of components in block diagram 600 of a wireless communication device 102 as illustrated by FIG. 6 may be essential to this disclosure, and thus, some of these items may be omitted, consolidated, or otherwise modified within reason. Additionally, in some implementations, the subject matter associated with the wireless communication device can be configured to include additional or substitute components, device elements, or hardware, beyond those depicted within the illustrations of FIG. 6.

Figure 7:
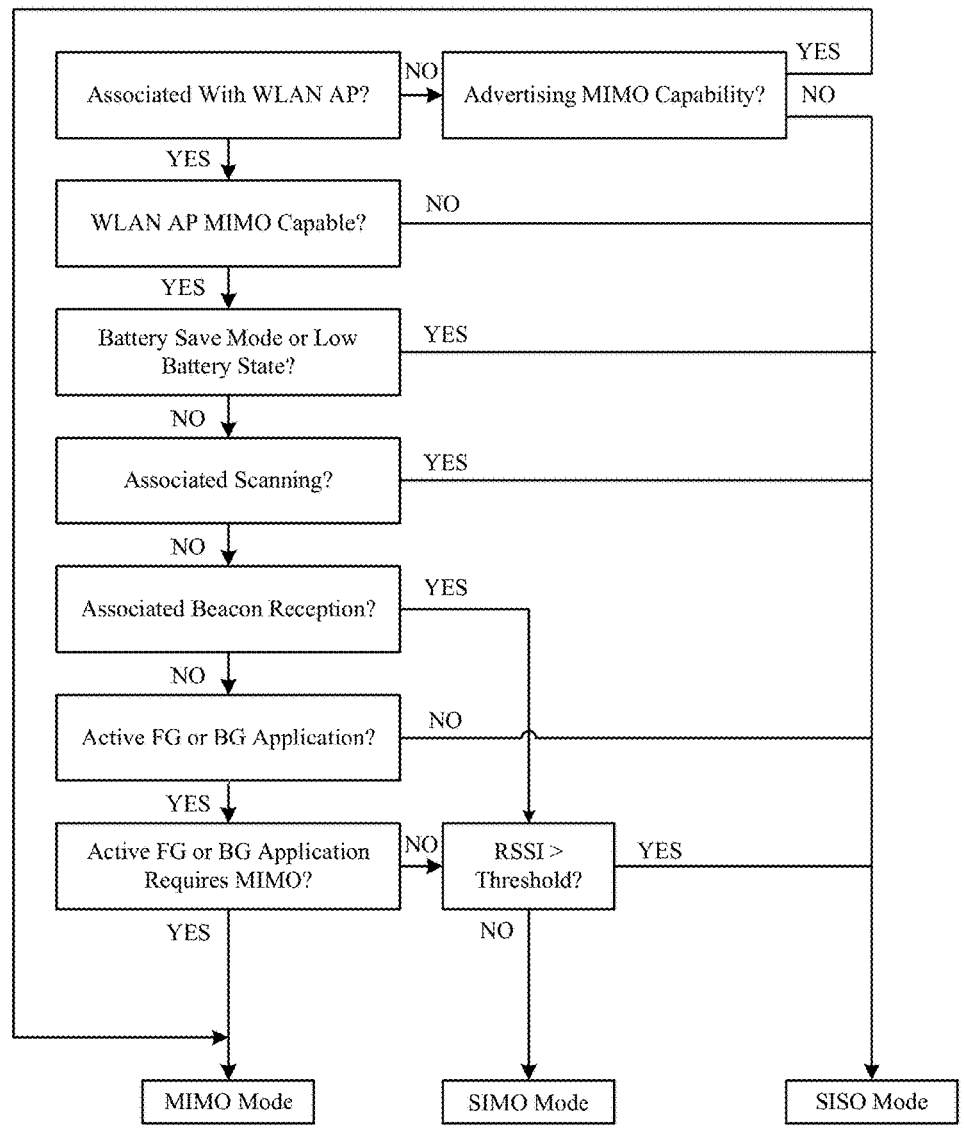
FIG. 7 illustrates a flowchart of an example decision tree to determine a configuration for wireless circuitry in a wireless communication device, in accordance with some embodiments.

FIG. 7 illustrates a flowchart 700 of an example decision tree to determine a configuration for wireless circuitry 616, such as WLAN wireless circuitry 302, of a wireless communication device 102 when associating with and/or associated with a WLAN AP 210. When the wireless communication device 102 is not yet associated with the WLAN AP 210 and performing an association operation, the wireless communication device 102 is configured to use a SISO mode except when advertising a MIMO capability to the WLAN AP 210, during which the wireless communication device 102 is configured to use a MIMO mode. When the wireless communication device 102 associates with a WLAN AP 210 that is not capable of operating in a MIMO mode, the wireless communication device 102 can be configured to operate in a SISO mode by default (and optionally use a SIMO mode when physical layer performance metrics indicate that a stable connection may require multiple RF receive chains enabled.) When the wireless communication device 102 is configured by the user to a battery save mode that prioritizes power savings over higher throughput data rates or when the battery level drops below a low battery threshold, the wireless communication device 102 can be configured to operate in the SISO mode. When associated with a WLAN AP 210 and scanning for other access points 210, the wireless communication device 102 can be configured to use a SISO mode. When associated with the WLAN AP 210 and waking to receive beacon signals from the WLAN AP 210, the wireless communication device can be configured to use a SISO mode with one RF receive chain active, when physical layer performance metrics indicate a stable connection exists, e.g., based on an RSSI exceeds a signal strength threshold, and to use a SIMO mode with multiple RF receive chains when the RSSI does not exceed the signal strength threshold. For any active foreground (FG) or background (BG) applications that require MIMO data throughput rates, such as based on the type of application or based on a size of file transfers required for the application, the wireless communication device 102 can use a MIMO mode at MIMO rates with multiple RF receive chains active and otherwise use a SISO mode or SIMO mode at SISO rates depending on the physical layer performance metrics, such as whether an RSSI value exceeds a signal strength threshold.

To switch between using a MIMO mode with multiple spatial streams to using a SISO mode (or SIMO mode) with a single spatial stream, the wireless communication device 102 can send a message (also referred to as an "action frame") to an associated WLAN AP 210, the message indicating that the wireless communication device 102 plans to switch to using a spatial multiplexing power save (SMPS) mode in which only one RF receive chain is active. As such the WLAN AP 210 must switch from using MIMO communication with multiple spatial streams at MIMO data rates to using SISO communication with a single spatial stream at SISO data rates in order for the wireless communication device 102 to enter the SMPS mode while successfully maintaining the connection with the WLAN AP 210. As the 802.11n wireless communication protocol only provides for an acknowledgement (ACK) from the WLAN AP 210 to indicate to the wireless communication device 102 that the message is successfully received and decoded and does not provide for a positive response that indicates that the WLAN AP 210 will honor the request to switch to the SMPS mode, the wireless communication device 102 can switch to using only one RF receive chain only after checking to determine whether the WLAN AP 210 has switched from using MIMO communication with multiple spatial streams to SISO communication with a single spatial stream for communicating with the wireless communication device 102.

The wireless communication device 102 will continue to use multiple RF receive chains, when operating in a MIMO mode, after sending the message indicating intention to switch to using only one RF receive chain in the SMPS mode, for at least a delay period of time, such as required when switching between MIMO data rates and SISO data rates and allowing for time for buffered data already formatted for MIMO communication by the WLAN AP 210 to be transmitted to the wireless communication device 102. This delay period of time can be referred to as a guard interval and can span a time period of approximately 100 milliseconds. After the guard interval, the wireless communication device 102 can monitor a number of subsequent packets received from the WLAN AP 210, and in some embodiments, only when all packets received from the WLAN AP 210 after the guard interval are communicated using a single spatial stream at SISO rates, the wireless communication device 102 switches to using only a single RF receive chain from using multiple RF receive chains. By keeping multiple RF receive chains active for both the guard interval and for an additional number of packets afterward, during which the wireless communication device 102 is configured to receive either multiple spatial streams at MIMO rates or single spatial streams with receive diversity. When at least one packet received by the wireless communication device 102, after sending the message indicating the intention to switch to using only one RF receive chain in the SMPS mode and after the guard interval, uses multiple spatial streams at MIMO rates, the wireless communication device concludes that the WLAN AP 210 may not have honored to request and continues to operate in the MIMO mode instead of switching to the SISO mode. The wireless communication device 102 can repeat sending the message indicating intention to switch to using only one RF receive chain in the SMPS mode to the WLAN AP 210 up to a maximum repeat request number of times, e.g., up to three times, when the WLAN AP 210 does not honor the previous request. If at least the maximum repeat request number of request messages to the WLAN AP 210 result in at least one packet received from the WLAN AP 210 at the wireless communication device 102, after each guard interval following the corresponding request, the wireless communication device 102 can continue to operate in the MIMO mode and not switch to SISO rates in an SMPS mode, as the WLAN AP 210 does not honor the requests to switch. The wireless communication device 102 can continue to operate in the MIMO mode with multiple spatial streams at MIMO rates while remaining associated with the WLAN AP 210. When the wireless communication device 102 disassociates from the WLAN AP 210 and subsequently re-associates with the same WLAN AP 210, the wireless communication device 102 can start afresh and assume that the WLAN AP 210 can potentially support the SMPS mode, e.g., the WLAN AP 210 configuration may have changed between associations. By proactively monitoring received packets from the WLAN AP 210 after requesting to switch to using a single spatial stream at SISO rates in an SMPS mode, the wireless communication device 102 can ensure that data is not lost (or at least minimize losses) to maintain and not drop active connections by only switching to a SISO mode at the wireless communication device 102 when confirmed by reception of at least a minimum number of packets using a single spatial stream at SISO rates. In some embodiments, the minimum number of packets is at least 100 successive packets received by the wireless communication device 102.

In some embodiments, the wireless communication device 102 also monitors one or more physical layer performance metrics for communication channels between the wireless communication device 102 and the WLAN AP 210 and only determines to switch to the SMPS mode when the physical layer performance metrics satisfy a performance threshold, such as when an RSSI exceeds a signal strength threshold level. At lower RSSI levels, the WLAN AP 210 may choose to switch to a single spatial stream at SISO rates based on rate adapting to a lower performance communication channel rather than based on honoring the request to switch to the SMPS mode sent by the wireless communication device 102. Thus, the wireless communication device 102, in some embodiments, can positively conclude that the WLAN AP 210 supports the SMPS mode when receiving at least the minimum number of packets after the guard interval, each packet using a single spatial stream at SISO rates, and the RSSI also exceeds the signal strength threshold level. By monitoring the packets after requesting to switch to the SMPS mode, the wireless communication device 102 learns whether the WLAN AP 210 supports the SMPS mode. In some embodiments, switching to the SMPS mode includes the wireless communication device 102 enabling only one RF receive chain for communication from the WLAN AP 210. In some embodiments, switching to the SMPS mode also includes the wireless communication device 102 enabling only one RF transmit chain for communication to the WLAN AP 210.

Figure 8:
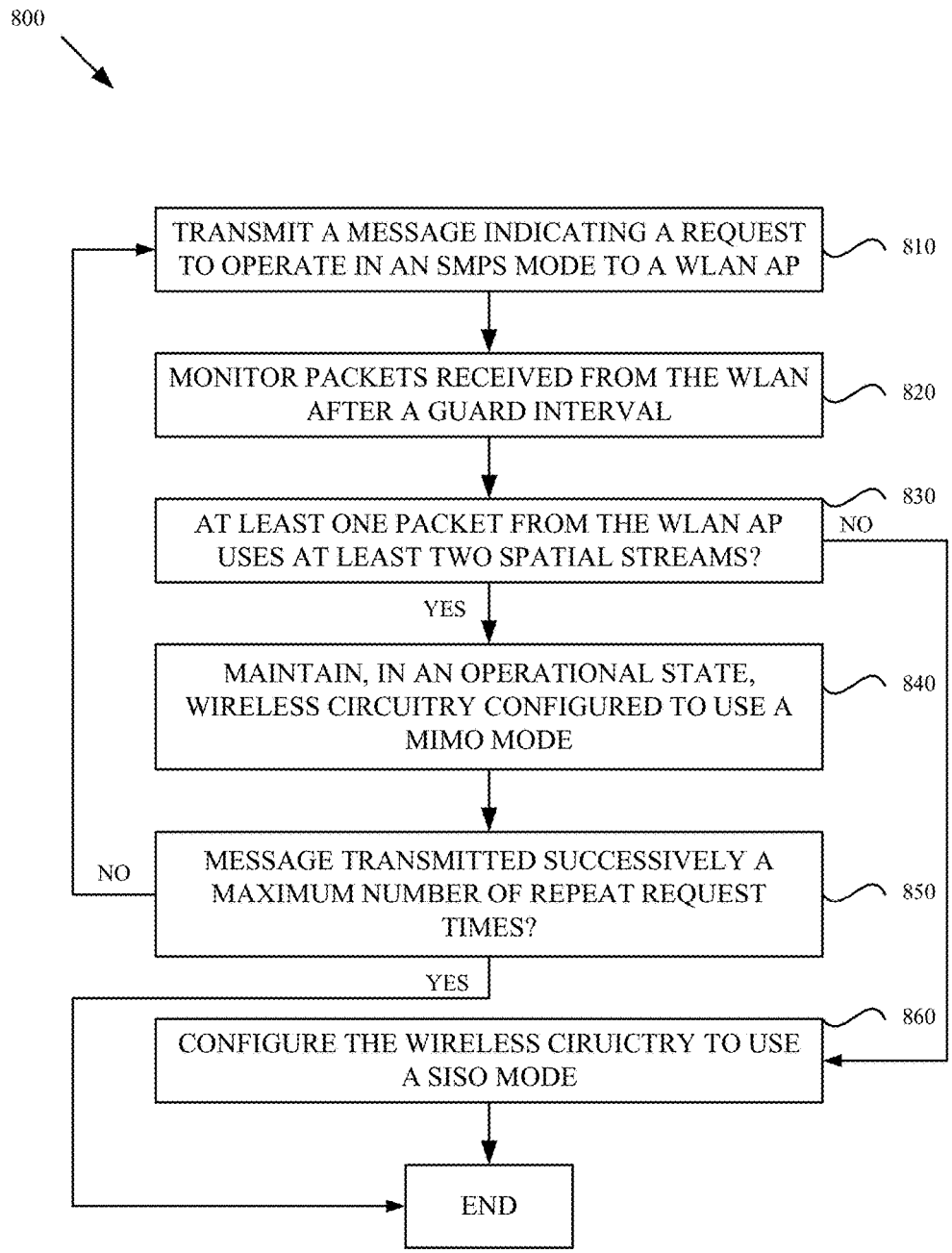
FIG. 8 illustrates a flowchart of an example method to learn whether an associated WLAN AP supports a spatial multiplexing power save (SMPS) mode, in accordance with some embodiments.

FIG. 8 illustrates a flowchart 800 of an example method for a wireless communication device 102 to learn whether an associated WLAN AP 210 supports an SMPS mode. At 810, the wireless communication device 102 transmits a message to the associated WLAN AP 210, the message indicating a request to operate in a spatial multiplexing power save (SMPS) mode, where the SMPS mode supports only one spatial stream in a SISO mode for communicating between the wireless communication device 102 and the WLAN AP 210. In some embodiments, the message requesting to operate in the SMPS mode is an SMPS request in accordance with an 802.11n wireless communication protocol. At 820, the wireless communication device monitors packets received from the WLAN AP 210 after waiting for a guard interval period of time. In some embodiments, the guard interval period of time spans at least one hundred milliseconds. At 830, the wireless communication device 102 determines whether at least one packet received from the WLAN AP 210 during the time period following the guard interval uses at least two spatial streams. When at least one packet uses at least two spatial streams, the wireless communication device, at 840, maintains wireless circuitry configured to use a MIMO mode that supports multiple spatial streams. In some embodiments the wireless circuitry configuration for the MIMO mode includes at least two RF receive chains enabled to process the at least two spatial streams. When none of the packets received from the WLAN AP 210 during the time period following the guard interval use at least two spatial streams, such as when all packets from the WLAN AP 210 during the time period use only one spatial stream, the wireless communication device 102, at 860, configures the wireless circuitry to use a SISO mode that includes support for communication using only one spatial stream with the WLAN AP 210. In some embodiments, all of the packets received after the guard interval must number at least a minimum successive packet threshold, e.g., at least one hundred successive packets. At 850, when a previous request message sent to the WLAN AP 210 does not succeed, e.g., based on the monitoring of the subsequent packets, the wireless communication device 102 determines whether to repeat transmission of the message to request to operate in the SMPS mode to the WLAN AP 210 and subsequently again monitor packets received from the WLAN AP 210. The request message can be retransmitted up to a maximum number of repeat request times. In some embodiments, the maximum number of repeat request times is three. After reaching the maximum number of successively transmitted requests to operate in the SMPS mode without successfully receiving at least the requisite number of successive packets from the WLAN AP 210 after the guard interval with all packets using only a single spatial stream, the wireless communication device 102 concludes that the WLAN AP 210 does not support the SMPS mode and refrains from requesting to switch to the SMPS mode for the remaining time while associated with the WLAN AP 210. In some embodiments, the wireless communication device 102 disassociates from the WLAN AP 210 when possible and re-associates with the WLAN AP 210 using only a SISO mode, e.g., by not indicating support for a MIMO mode when re-associating with the WLAN AP 210.

The various aspects, embodiments, implementations or features of the described embodiments can be used separately or in any combination. Further, some aspects of the described embodiments may be implemented by software, by hardware, or by a combination of hardware and software. The described embodiments can also be embodied as computer program code stored on a non-transitory computer-readable medium. The computer readable-medium may be associated with any data storage device that can store data, which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for configuring wireless circuitry in a wireless communication device, the method comprising:
    by the wireless communication device:
        transmitting a message indicating a request to operate in a spatial multiplexing power save (SMPS) mode to a wireless local area network (WLAN) access point (AP) associated with the wireless communication device, the SMPS mode supporting only one spatial stream in a single-input single-output (SISO) mode;
        monitoring packets received from the WLAN AP after transmitting the message and following a guard interval;
        maintaining, in an operational state, the wireless circuitry configured to use a multiple-input multiple-output (MIMO) mode that includes at least two spatial streams for communication between the wireless communication device and the WLAN AP, when receiving at least one packet from the WLAN AP that uses at least two spatial streams; and
        configuring the wireless circuitry to use the SISO mode, which includes only a single spatial stream for communication between the wireless communication device and the WLAN AP, when all packets received from the WLAN AP after the guard interval use only one spatial stream, and a number of packets received equals or exceeds a minimum successive packet threshold.

2. The method of claim 1, wherein the minimum successive packet threshold comprises at least one hundred successive packets received after the guard interval, and wherein the guard interval spans at least one hundred milliseconds.

3. The method of claim 1, wherein the wireless circuitry is configured to use the MIMO mode by enabling at least two radio frequency (RF) receive chains to process the at least two spatial streams.

4. The method of claim 1, wherein configuring the wireless circuitry to use the SISO mode comprises enabling only one radio frequency (RF) receive chain to process the single spatial stream received from the WLAN AP.

5. The method of claim 4, wherein configuring the wireless circuitry to use the SISO mode further comprises enabling only one RF transmit chain for communication to the WLAN AP.

6. The method of claim 1, wherein the message indicating the request to operate in the SMPS mode comprises an SMPS request in accordance with an 802.11n wireless communication protocol.

7. The method of claim 1, further comprising:
    by the wireless communication device:
        retransmitting the message indicating the request to operate in the SMPS mode up to a maximum repeat request number of times; and
        maintaining, in the operational state, the wireless circuitry configured to use the MIMO mode that includes at least two spatial streams for communication between the wireless communication device and the WLAN AP when receiving at least one packet from the WLAN AP that uses at least two spatial streams after a corresponding guard interval following each retransmitted message.

8. A wireless communication device comprising:
    wireless circuitry including a plurality of radio frequency (RF) receive chains;
    one or more processors coupled to the wireless circuitry; and
    a memory coupled to the one or more processors,
    wherein the one or more processors are configured to execute computer-executable instructions stored within the memory to cause the wireless communication device to:
        transmit a message indicating a request to operate in a spatial multiplexing power save (SMPS) mode to a wireless local area network (WLAN) access point (AP) associated with the wireless communication device, the SMPS mode supporting only one spatial stream in a single-input single-output (SISO) mode;
        monitor packets received from the WLAN AP after transmitting the message and following a guard interval;

maintain, in an operational state, the wireless circuitry configured to use a multiple-input multiple-output (MIMO) mode that includes at least two spatial streams for communication between the wireless communication device and the WLAN AP, when receiving at least one packet from the WLAN AP that uses at least two spatial streams; and configure the wireless circuitry to use the SISO mode, which includes only a single spatial stream for communication between the wireless communication device and the WLAN AP, when all packets received from the WLAN AP after the guard interval use only one spatial stream, and a number of packets received equals or exceeds a minimum successive packet threshold.

9. The wireless communication device of claim 8, wherein the minimum successive packet threshold comprises at least one hundred successive packets received after the guard interval, and wherein the guard interval spans at least one hundred milliseconds.

10. The wireless communication device of claim 8, wherein the wireless communication device configures the wireless circuitry to use the MIMO mode by enabling at least two radio frequency (RF) receive chains to process the at least two spatial streams.

11. The wireless communication device of claim 8, wherein the wireless communication device configures the wireless circuitry to use the SISO mode by enabling only one radio frequency (RF) receive chain to process the single spatial stream received from the WLAN AP.

12. The wireless communication device of claim 11, wherein the wireless communication device configures the wireless circuitry to use the SISO mode further by enabling only one RF transmit chain for communication to the WLAN AP.

13. The wireless communication device of claim 8, wherein the request to operate in the SMPS mode comprises an SMPS request in accordance with an 802.11n wireless communication protocol.

14. The wireless communication device of claim 8, wherein the one or more processors are configured to execute computer-executable instructions stored within the memory to further cause the wireless communication device to:

retransmit the message indicating the request to operate in the SMPS mode up to a maximum repeat request number of times; and maintain, in the operational state, the wireless circuitry configured to use the MIMO mode that includes at least two spatial streams for communication between the wireless communication device and the WLAN AP when receiving at least one packet from the WLAN AP that uses at least two spatial streams after a corresponding guard interval following each retransmitted message.

15. A non-transitory computer-readable medium storing instructions for configuring wireless circuitry of a wireless communication device, the instructions, when executed by one or more processors, cause the wireless communication device to:

transmit a message indicating a request to operate in a spatial multiplexing power save (SMPS) mode to a wireless local area network (WLAN) access point (AP) associated with the wireless communication device, the SMPS mode supporting only one spatial stream in a single-input single-output (SISO) mode;

monitor packets received from the WLAN AP after transmitting the message and following a guard interval;

maintain, in an operational state, the wireless circuitry configured to use a multiple-input multiple-output (MIMO) mode that includes at least two spatial streams for communication between the wireless communication device and the WLAN AP, when receiving at least one packet from the WLAN AP that uses at least two spatial streams; and configure the wireless circuitry to use the SISO mode, which includes only a single spatial stream for communication between the wireless communication device and the WLAN AP, when all packets received from the WLAN AP after the guard interval use only one spatial stream, and a number of packets received equals or exceeds a minimum successive packet threshold.

16. The non-transitory computer-readable medium of claim 15, wherein the minimum successive packet threshold comprises at least one hundred successive packets received after the guard interval, and wherein the guard interval spans at least one hundred milliseconds.

17. The non-transitory computer-readable medium of claim 15, wherein the wireless communication device configures the wireless circuitry to use the MIMO mode by enabling at least two radio frequency (RF) receive chains to process the at least two spatial streams.

18. The non-transitory computer-readable medium of claim 15, wherein the wireless communication device configures the wireless circuitry to use the SISO mode by enabling only one radio frequency (RF) receive chain to process the single spatial stream received from the WLAN AP.

19. The non-transitory computer-readable medium of claim 15, wherein the request to operate in the SMPS mode comprises an SMPS request in accordance with an 802.11n wireless communication protocol.

20. The non-transitory computer-readable medium of claim 15, wherein execution of the instructions by the one or more processors, further cause the wireless communication device to:

retransmit the message indicating the request to operate in the SMPS mode up to a maximum repeat request number of times; and maintain, in the operational state, the wireless circuitry configured to use the MIMO mode that includes at least two spatial streams for communication between the wireless communication device and the WLAN AP when receiving at least one packet from the WLAN AP that uses at least two spatial streams after a corresponding guard interval following each retransmitted message.

* * * * *